Feb. 8, 1927. 1,616,592
E. J. MARTEL
AUTOMOBILE LOCK
Filed Nov. 2, 1923 7 Sheets-Sheet 3

Inventor:
Edgar J. Martel
by Wright Brown Quinby May
Attys.

Patented Feb. 8, 1927.

1,616,592

UNITED STATES PATENT OFFICE.

EDGAR J. MARTEL, OF LACONIA, NEW HAMPSHIRE.

AUTOMOBILE LOCK.

Application filed November 2, 1923. Serial No. 672,364.

This invention relates to the type of automobile lock disclosed by my Patent No. 1,449,769, dated March 27, 1923, and designed to prevent unauthorized persons from driving an automobile equipped with the lock. For this purpose the patented lock provides mechanism for locking the ignition switch in off position, and the clutch and brake pedals, or both, in unclutched and brake positions. In order to provide for various lighting requirements, the lighting system may be locked in any position desired, so that tampering therewith is prevented. As it is always desirable that the ignition be in the off position when the car is locked, the patented invention provides means by which, should the ignition be on, it is automatically thrown off when the car is locked.

Further the said invention provides a single handle or pull member by which the various locking actions above mentioned are effected, this member being released by means of a key to unlock the parts simultaneously.

The present invention has for its chief object to provide an enlarged or more complete locking system, employing additional locking means for locking additional parts such as the emergency brake lever, the transmission lever, and the starting switch, the locking elements of said means being made operative by the above-mentioned single handle or pull member to lock said additional parts, and made inoperative simultaneously when the handle or pull member is released by a key.

For a more complete understanding of the present invention, together with further objects and advantageous details and combinations of parts, reference may be had to the accompanying drawings illustrating the patented invention and several embodiments of the present invention, in which—

To avoid the necessity of reference to my above-mentioned patent for a complete understanding of the present invention, I will first describe the mechanism of the patented invention, with certain minor improvements which are claimed in this application.

The horizontal floor 25 of the car joins an inclined floor portion 26, which in turn joins a vertical wall portion 27. Positioned rearwardly from the wall portion is the instrument-board 28, on which the various switches and the locking mechanism are mounted. Fixed to a suitable part of the car, such as a member 29 of the chassis frame, is a housing or casing 30, preferably provided with an angular ear or bracket 31, which is bolted to the member 29. The housing is provided with a pair of slots 32 and 33, in which the usual clutch and brake pedals 34 and 35 (Figure 6) are movable, said pedals being pivoted at 36 on a shaft. When either pedal is depressed in the performance of its function, it enters the corresponding slot, as indicated by dotted lines in Figures 1 and 6, sufficiently to be confined in the depressed position by means within the housing 30.

Figure 5:
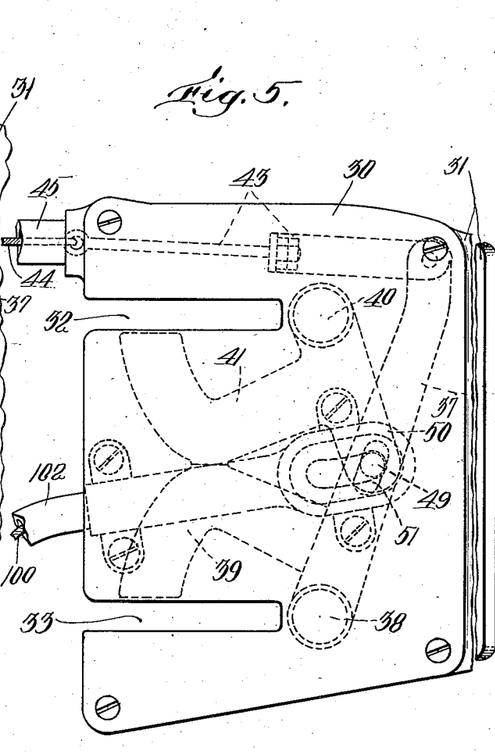
Figure 5 is a top plan view of the pedal locking mechanism.
Figures 6, 7:
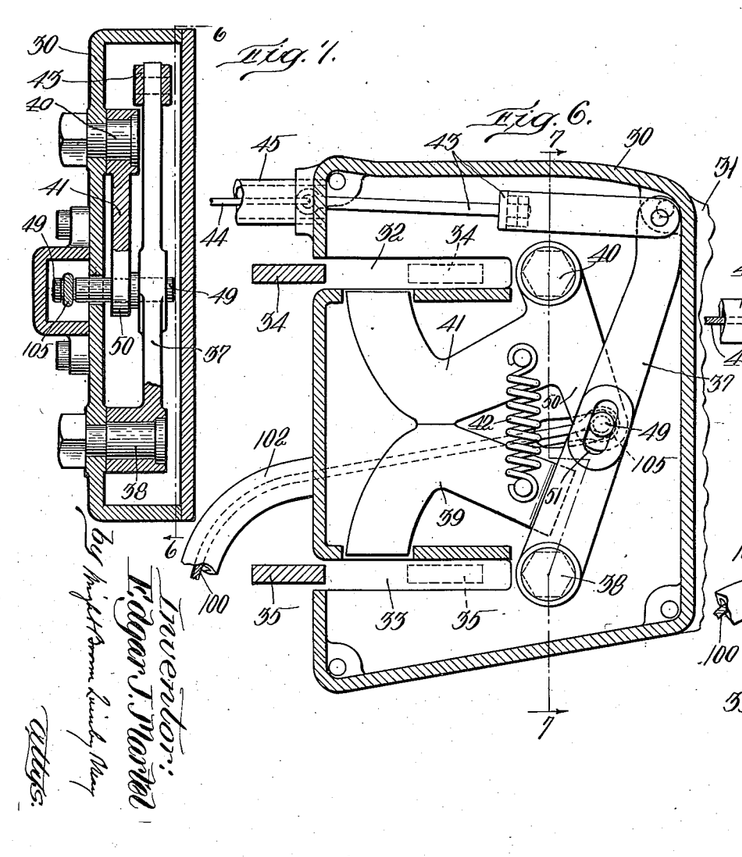
Figure 6 is a section on line 6—6 of Figures 1 and 7.
Figure 7 is a section on line 7—7 of Figure 6.
Figure 9:
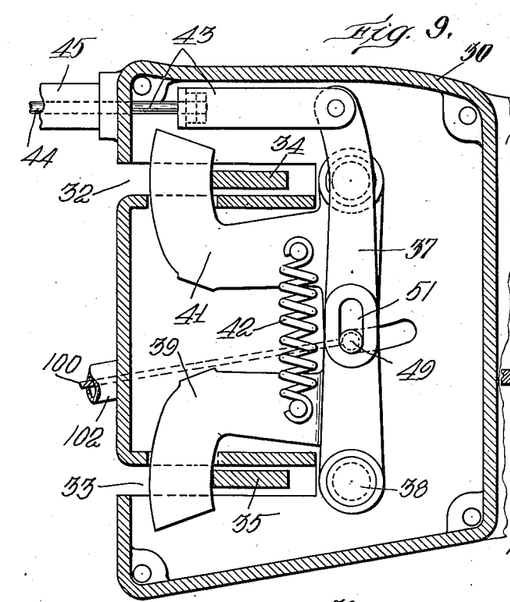
Figure 9 is a section similar to Figure 6, but showing the parts in operative or locking position.

As shown more particularly by Figures 5, 6 and 9, the housing 30 contains a lever 37, which is pivoted at 38 to the housing, and is provided with a hooked arm 39, which may be moved into the slot 33 to confine the depressed brake pedal 35 in the slot. Pivoted at 40 to the housing is a hooked lever 41, which may be moved into the slot 32 to confine the depressed clutch pedal 34 in the slot, as shown also by Figure 9. The lever 37, its hooked arm 39, and the hooked lever 41, are normally held in the retracted positions shown by Figure 6, by a spring 42, which has an additional function relating to the additional locking means of the present invention, as hereinafter described.

To the free end of the lever 37 is connected, as by a link 43, a cable 44. This cable projects outwardly through a pipe 45, made fast at its lower end to the housing 30, this pipe projecting upwardly through the inclined floor portion 26, and horizontally through the instrument-board 28 to a casing 46, mounted on the inner face of the instrument-board.

Figures 2, 3, 4, 24, 25, 26:
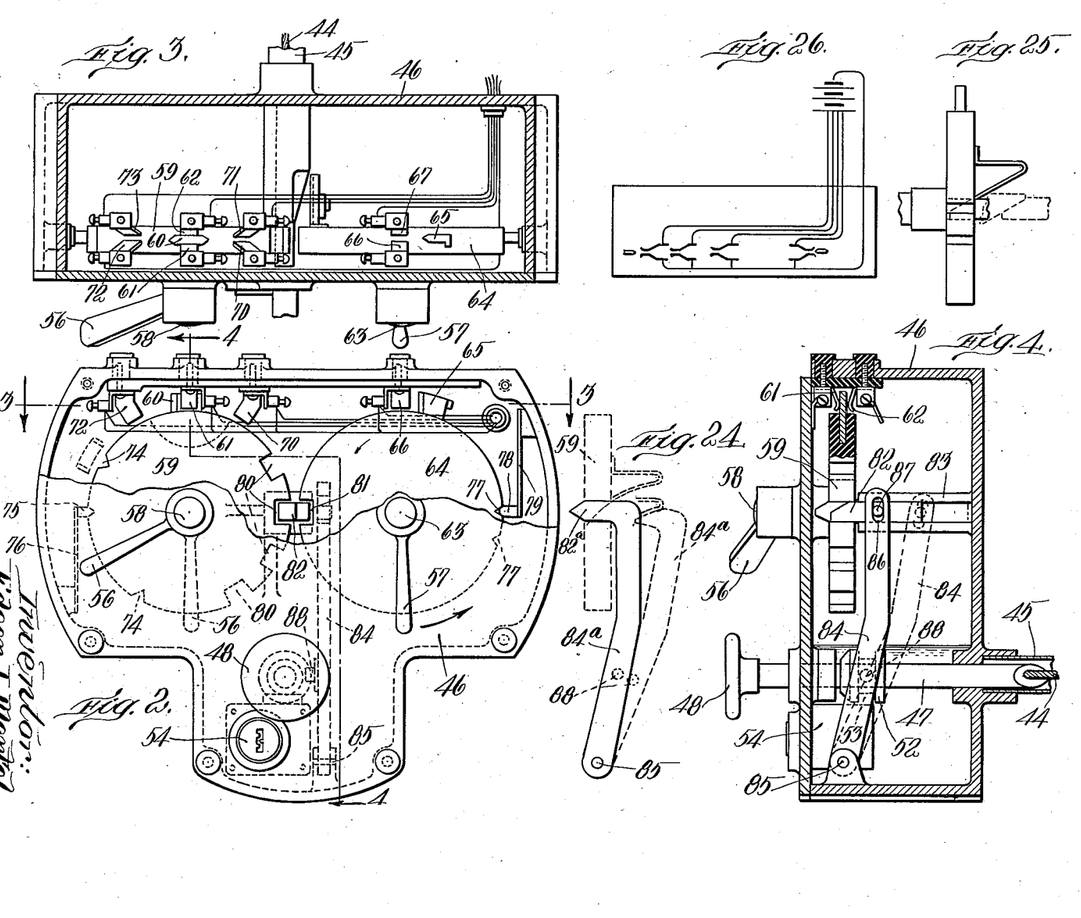
Figure 2 is a front elevation of the ignition and lighting switch.
Figure 3 is a section on line 3—3 of Figure 2.
Figure 4 is a vertical section on line 4—4 of Figure 2.
Figure 24 is a detail view showing the disk-locking lever or finger in different positions.
Figure 25 is a side view of the ignition switch, showing the locking bolt in dotted lines.
Figure 26 is a diagram of the ignition and lighting circuits at the instrument-board.

As shown more particularly by Figure 4, the upper end of the cable 44 is attached to a pull rod 47, which extends through the forward face of the casing 46, and terminates in a handle or pull member 48, within easy reach of the operator of the vehicle.

When the rod 47 is pulled outward, it moves the cable to the position shown by Figure 9, and thus causes the simultaneous projection of the hooked arm 39, and the hooked lever 41. Said arm is rigidly attached to the lever 37, and the hooked lever is loosely connected with the lever 37 by a pin or stud 49, fixed to an arm 50 of the hooked lever, and projecting into a slot 51 formed in the lever 37.

The stud 49 has an additional function relating to the additional locking means of the present invention, as hereinafter described. Whenever one or both of the pedals 34 and 35 has or have been depressed to throw out the clutch or apply the brake, or both, in pulling the handle 48, these pedals may be retained in depressed condition, thus holding the clutch out of operation, or the brake applied, or both.

In order to retain the pull rod 47 in its outward position, it may be provided with a grooved collar 52, within the casing 46, and engageable by the bolt 53 (Figure 4) of a lock 54, this lock being accessible from the forward face of the casing to a key by which it may be unlocked when it is desired, to permit the pedals to resume their normally raised positions.

The casing 46, as in my patented invention, also contains the switch mechanism controlling the ignition for the engine and the lights for the car. The lighting switch-operating handle is indicated at 56, and the ignition switch handle at 57. The handle 56 is fixed to a shaft 58, extending within the casing and carries therein a disk 59 of insulating material. This disk carries a metallic contact 60, which may be brought in turn into bridging contact between pairs of spring terminals 61 and 62. The handle 57 is similarly fixed to a shaft 63 carrying within the casing a disk of insulating material 64, which carries also a similar metallic contact element 65, which may make bridging contact between the terminals 66 and 67 of the ignition circuit.

A single pair of terminals only is required for the ignition circuit, but the lighting circuit requires a plurality of such pairs, in the present embodiment three being shown, one pair being indicated at 61 and 62 and similar pairs adjacent thereto being indicated at 70 and 71 and 72 and 73. For example, the terminals 70 and 71 when connected by the metallic bridge 60, may close the circuit for bright lights, while the contacts 61 and 62, when bridged, may close the circuit for dim lights, and the contacts 72 and 73, when bridged, may close the contact for curb light.

For holding the switch yieldingly in any of its positions, the outer edge of the disk 59 has a series of notches or depressions 74 therein for engagement by a spring finger 75, mounted at one end of a leaf spring 76 fixed at its other end to the wall of the casing. The number of notches 74 is greater by one than the number of pairs of contacts for the various lighting circuits, the additional notch serving to hold the disc in position where no contacts are bridged, this being the off position of the switch when no lights are burning. The disc 64 is similarly provided with a pair of notches 77 with which cooperates a spring finger 78, carried at the end of a leaf spring 79, fixed to the casing, these notches determining on and off positions for the ignition. The disc 59 also has a series of rectangular notches 80, corresponding in number and relative position to the notches 74, while the disk 64 has a similar notch at 81, there being one such notch only in this disk. These notches are so positioned that when the ignition circuit is in off position, in which case the contact 65 fails to bridge the contacts 66 and 67, the notch 81 will be substantially opposite to one of the notches 80 of the disc 59, the discs 59 and 64 being positioned in the same plane.

A locking bolt or plunger 82 is mounted in a guideway 83, fixed to the rear face of the casing 46, in position so that its forward end may be projected within the slots 80 and 81, so that when in projected position, both discs 59 and 64 are locked against turning movement. This locking bolt is projected by means of a lever 84, pivoted at 85, to a portion of the casing and having a slot at its upper end at 86, engaging over a pin 87, fixed to the bolt 82. Near its lower end lever 84 carries on one face thereof a pin 88, riding in the groove in the locking collar 52. By this means when the handle 48 is pulled outwardly by the operator, not only is the cable 44 pulled to lock the pedals, but also by acting on the lever 84, the locking bolt 82 is projected within the notches 80 and 81, so the ignition and lighting circuits are also locked.

To enable the car to be locked with the ignition off, one notch 81 only has been provided for the disc 64. To further insure that the ignition be off when locking is effected, provision is made by which, should this switch not be in off position, it will be thrown to such position on the locking of the car, all as set forth in my patent above mentioned.

In carrying out the present invention, I have improved the means for locking the clutch and brake pedals and for installing said means on the car, said improved means including the casing or housing 30, supported by a part of the car other than the steering-post, and the devices within said housing shown by Figures 5 and 6.

I have also added to the locking means of the patented invention, additional locking means for locking the emergency brake lever, the transmission lever and the starting switch, said additional means being operable simultaneously with the means for locking the clutch and brake pedals, by the pull rod 47, all as next described.

The emergency brake lever 90 which, as here shown, is pivoted on the shaft 36, is provided as usual, with a pawl 91, held yieldingly in engagement with a tooth of a fixed ratchet segment 92, and retractable by a rod 93, carried by the lever to release the latter.

Figures 1, 14, 17:
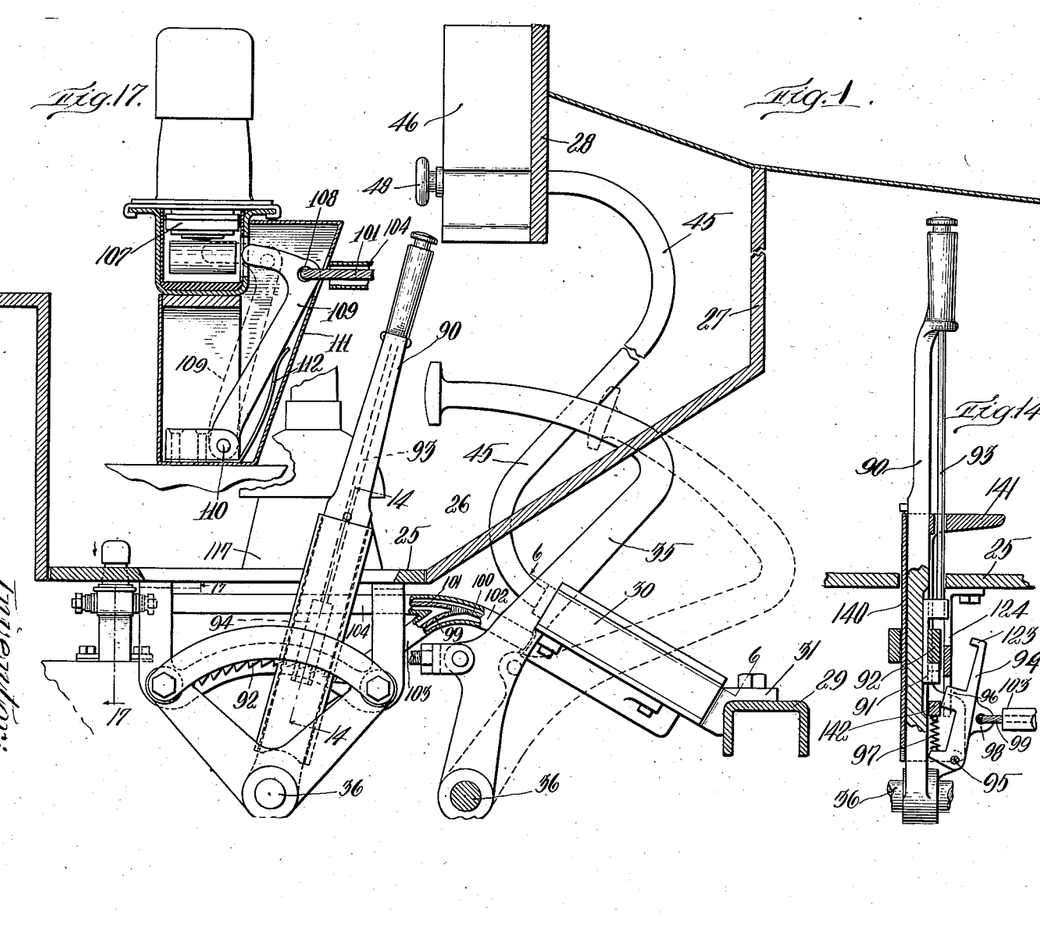
Figure 1 is a fragmentary longitudinal section of an automobile, but showing the parts embodying my invention in side elevation.
Figure 14 is a fragmentary section of the emergency brake lever on line 14—14 of Figure 1.
Figure 17 is a section of the starting switch on line 17—17 of Figure 1.
Figures 8, 16:
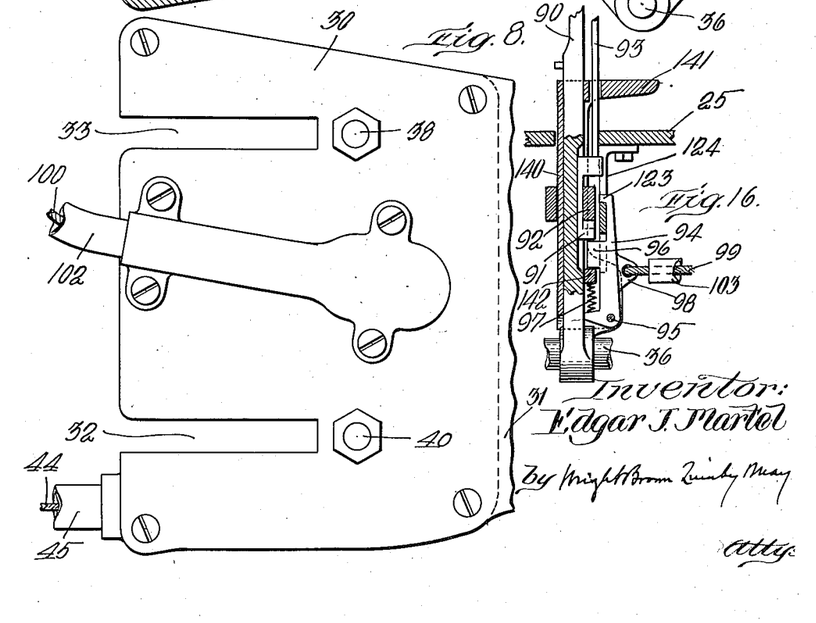
Figure 8 is a bottom plan looking at the opposite side of Figure 5.
Figure 16 is a view similar to Figure 14, but showing the parts in locking position.

An element of the said additional locking means, is a locking member which, in this instance, is a short oscillatory locking arm 94 (Figures 14 and 16), pivoted at 95 to the lever 90, and provided with a tooth 96 adapted, as shown by Figure 16, to contact with the pawl 91, and lock the latter in engagement with the ratchet. The locking arm 94 is biased by a spring 97, so that it is normally in its pawl-locking position. Secured to an ear 98, on the locking arm, is a branch 99 of a cable 100. This cable, its branch 99 and another branch 101 hereinafter described, are movable in a pipe 102, fixed to the casing 30, and is provided with branches 103 and 104, in which the cable branches are movable. The pipe branch 103 extends as shown by Figure 14, to the vicinity of the locking arm 94. The main cable 100 has a loop 105, at one end, embracing the pin or stud 49 in the casing 30, as shown by dotted lines in Figure 6. When the lever 37 of the clutch and brake pedal locking means is held by the spring 42 in its normal position, as shown by Figure 6, the pedals being unlocked, the cable 100 and its branches are tensioned, so that the locking arm 94 is held by the branch cable 99 in the retracted position shown by Figure 14. When the lever 37 is moved to the position shown by Figure 9, to lock the pedals, the cable 100 and its branches are loosened or deprived of tension, and the locking arm 94 is caused by the baising spring 97 to lock the pawl 91 of the emergency brake.

Figures 18, 19, 20, 21:
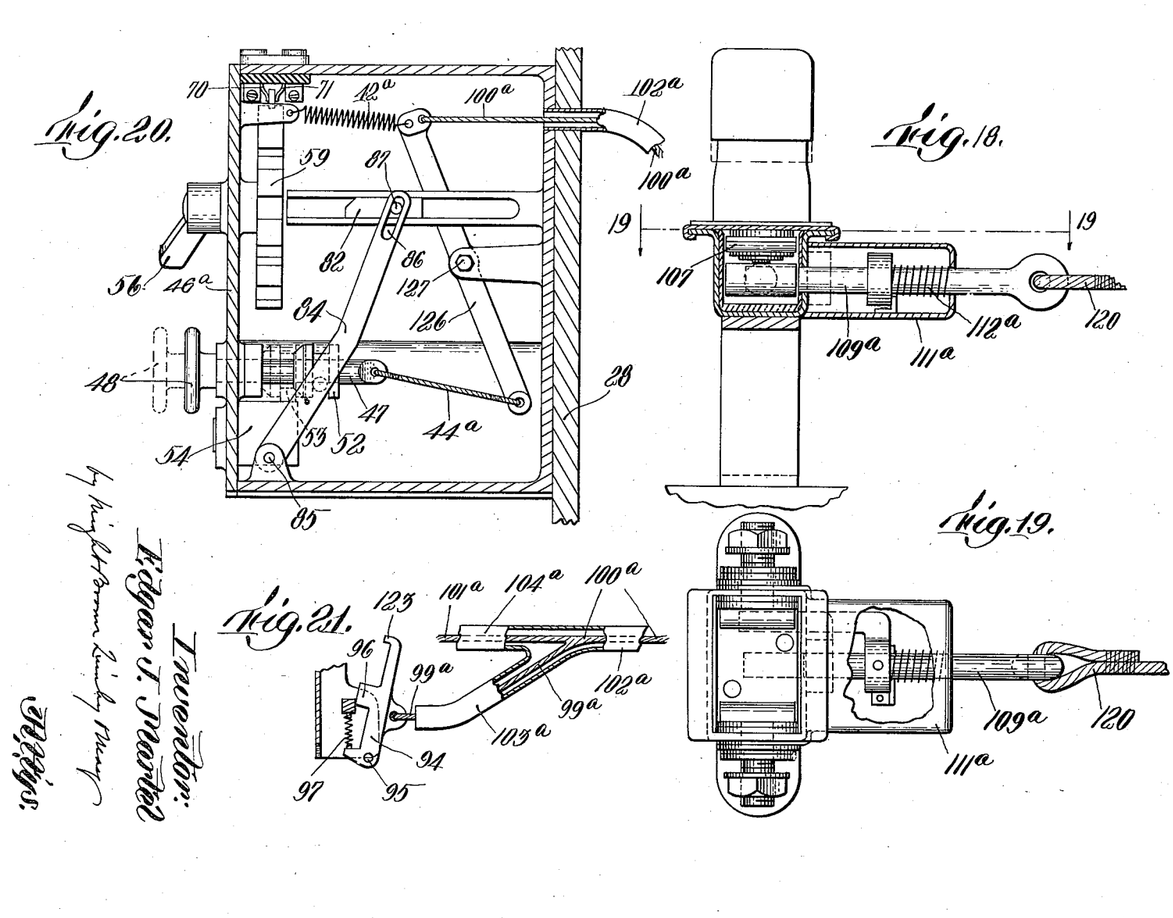
Figure 18 is a view similar to Figure 17, showing a modified construction of locking mechanism.
Figure 19 is a cross section on line 19—19 of Figure 18.
Figures 20, 21, 22, 23 and 23ª are fragmentary views showing different embodiments of the invention.

The pipe branch 104 extends to the vicinity of the starter switch, a portion of the pedal or plunger 107 of which is shown by Figure 17, and the cable branch 101 extends through this pipe branch, and is connected at 108 with a locking member, here shown as an arm 109, constituting another element of said additional locking means. The starter switch locking arm 109 is pivoted at 110 to a fixed support, and is contained in a fixed housing 111 beside the starter switch, the branch cable 101 passing through an opening in the housing. When the cable 100 and its branches are tensioned, as above described, the locking arm 109 is held in the retracted position shown by full lines in Figure 17, the starter switch plunger being free to descend. When said cable is released from tension, the locking arm 109 is projected by a biasing spring 112 to the dotted line position shown by Figure 17, and is caused to lock the plunger 107 in its raised position, and prevent the operation of the starter switch. A modification is shown by Figures 18 and 19, in which a locking bolt 109ª is substituted for the locking arm 109. This bolt is slidable in a housing 111ª, and is projected by a biasing spring 112ª under the plunger 107, when the cable branch 101, which is connected with the bolt, is deprived of tension, the bolt being retracted by the cable branch when the latter is tensioned.

The transmission or gear shaft lever 114, which cooperates as usual with the gear shift rods 115, may be locked in various positions against unauthorized movement, by a member here shown as a locking bolt 116

Figures 10, 11, 12, 13:
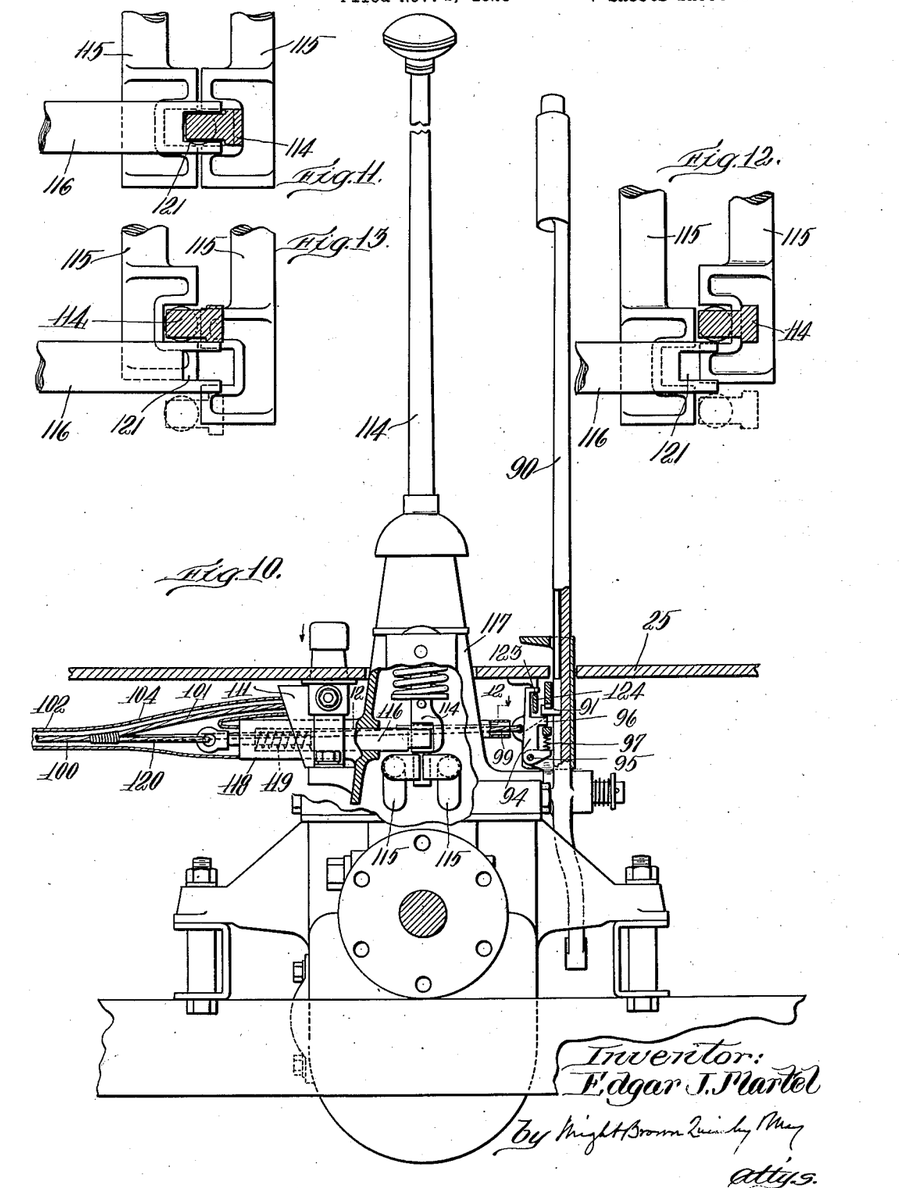
Figure 10 is a rear elevation of the transmission case with parts broken away.
Figures 11, 12 and 13 are detail views showing the different positions in which the parts may be locked against further movement.

(Figures 10 and 13), constituting another element of the said additional locking means. As usual the gear shift lever 114 is mounted on a fixed shoulder 117, for a swinging movement in various directions, its lower end being engaged with the longitudinally movable gear shift rods 115, to move said rods to the different relative positions for neutral, forward, or reverse gear connections, as shown by Figures 11, 12 and 13. The locking member or bolt 116, is slidable in a housing 118, fixed to the support 117, and is normally pressed inward toward the lever 114 by a biasing spring 119.

A third branch 120 of the cable 100 is connected as shown by Figure 10 with the outer end of the locking member or bolt 116. The inner end of the said member is provided with a slot 121, so that said end is forked and is adapted to bestride the lower end of the gear shift lever, and lock the lever and the gear shift rods in the relative positions shown by Figure 11.

The locking member is also adapted to bear on either side of the gear shift lever, and lock the lever and the gear shift rods selectively in any of the relative positions shown by Figures 12 and 13. When the cable 100 and its branches are deprived of tension, the branch 120 permits the spring 119 to project the locking member 116 to its operative position, and when the cable is tensioned, the cable branch 120 retracts the locking member.

It will now be seen that provision is made for simultaneously locking the clutch and brake pedals, the ignition and lighting system, the emergency brake lever, the starting switch, and the gear shift lever, by a movement of a single pull rod or handle to a locking position, and by then locking the pull rod. This movement directly causes the locking of the pedals and the said system, and permits the biasing springs of the various additional locking members to project said members into locking positions. The same movement of the pull rod tensions or sets for action the spring 42, so that when the pull rod is unlocked, the spring acts to simultaneously retract the locking members of the pedals and of the emergency brake lever, the starting switch and the gear shift lever.

I prefer to utilize the biased locking member 94, to lock the floor portion 25, which is usually removable, so that when the member 94 is in position to lock the emergency brake, it also prevents removal of said floor portion. To this end I provide the free end of the locking member 94 with a finger 123 (Figures 10 and 14), adapted to engage a slotted ear or bracket 124, fixed to the floor portion 25.

It will be seen that I have associated with the controls of an automobile, viz, the controls having as elements the clutch and brake pedals, the control having as an element the emergency brake lever, the control having as an element the plunger of the starting switch, and the control having as an element the gear shift lever, a series of locking members, adapted to be simultaneously engaged with said elements, the locking members which engage the pedals being normally retracted by the spring 42, while the locking members which engage the other control elements are biased and normally projected. Said locking members simultaneously engage the respective control elements when the pull cable 44 (which I call the primary cable) is pulled, the pulling operation projecting the pedal-locking members and tensioning the spring 42, and at the same time depriving the cable 100 (which I call the secondary cable) of tension, so that the springs of the biased locking members are enabled to project said members into locking position. When the primary pull cable is released, the tensioned spring 42 acts to retract the pedal-locking members, and at the same time tension the secondary cable and cause it to retract the biased locking members.

It is obvious that the invention may be carried out, by providing but one biased locking member, instead of the plurality here shown.

The biased locking members cooperating with the auxiliary controls may be operated independently of the locking members 39 and 41 for the brake and clutch pedals, in which case the last mentioned locking members, and the casing 30 containing the same may be omitted, the lock being organized to confine and release only the biased locking members.

A suitable organization for this purpose is shown by Figures 20 and 21. The casing 46ª shown by Figure 20 is deeper than the casing 46, and is fixed to the instrument-board 28. The primary cable designated by 44ª is contained entirely in the casing 46ª and connects the pull rod 47 with one arm of a lever 126 which is fulcrumed at 127 to a fixed support within the casing. To the other arm of said lever are connected a spring 42ª substituted for the spring 42, and a secondary cable 100ª substituted for the secondary cable 100. The spring is secured to a fixed support within the casing, and the secondary cable extends through a pipe 102ª, substituted for the pipe 102 and fixed at one end to the instrument-board. The opposite extremity of the pipe has branches as 103ª and 104ª extending into suitable proximity to biased locking members, such as the emergency brake locking member 94, the starter switch locking member 109 or 109ª and the transmission locking member 116, only one of said biased members being shown by Figure 21. The secondary cable branches extend through the pipe branches to the corresponding biased locking members, one of these cable branches —99ª— being shown connected with the biased locking member 94. The other cable branches (only one of which —101ª— is shown) are suitably connected with the other biased locking members. The spring 42ª normally acts through the lever 126 to hold the primary cable 44ª and the pull rod 47 retracted (the pull rod being unlocked) and the secondary cable 100ª under tension (the biased locking members being retracted). When the pull rod 47 is pulled outward and locked, the lever 126 is moved to position to tension the spring and deprive the secondary cable of tension, so that the biased locking members are permitted to lock the respective control elements. When the pull rod is unlocked, the tensioned spring returns the parts to the position shown by Figure 20, the secondary cable being again tensioned and caused to retract the biased locking members. The member 44ª is, in this embodiment, a connection serving to transmit motion from the pull rod to the lever 126, and from the lever to the pull rod, so that said member may or may not be a flexible cable.

Figures 22, 23, 23A:
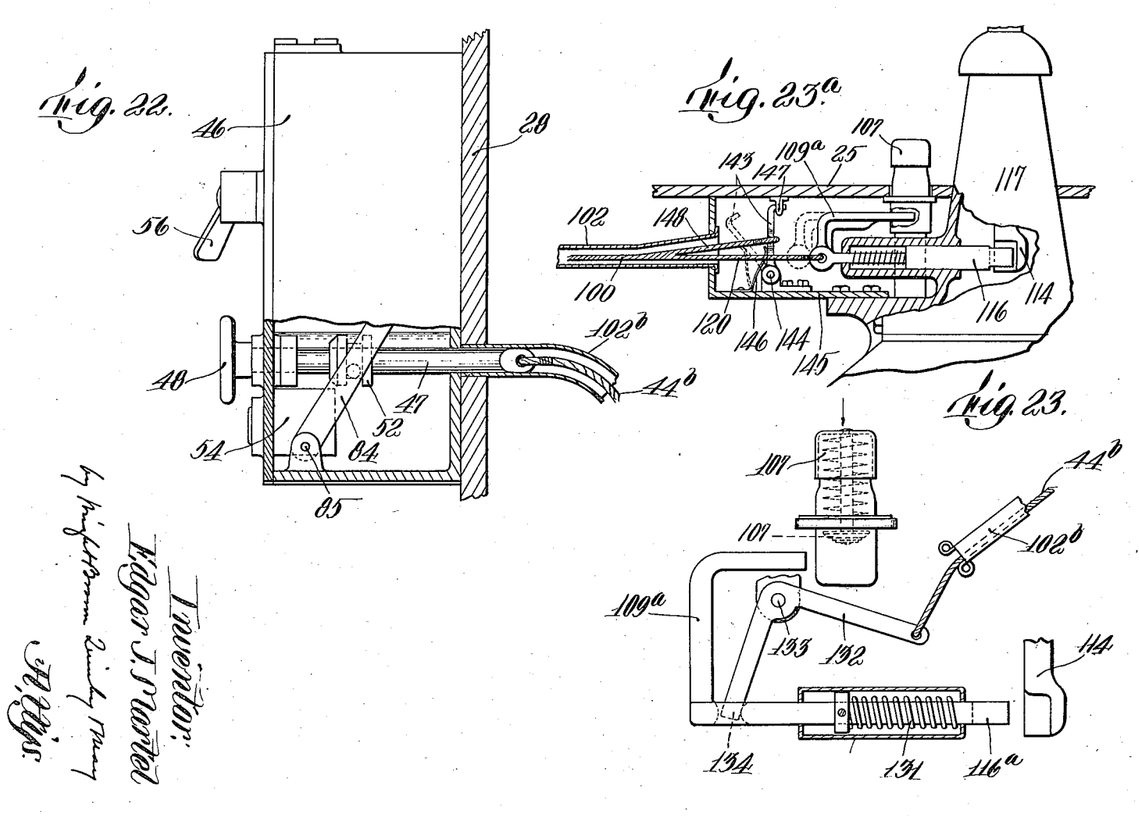

The invention may be embodied as shown by Figures 22 and 23 in a lock in which a biased locking member cooperating with an auxiliary control is provided with a biasing spring 131 which is employed as an equivalent of the spring 42 or the spring 42ª, and normally retracts the locking member instead of normally projecting it.

Figure 23 shows a locking member 116ª substituted for the member 116 which locks the gear shift lever 114. The member 116ª is slidable in a guide or housing 130 and is normally retracted from the gear shift lever by a strong biasing spring 131 in said housing. A pull cable 44ᵇ extending through a fixed pipe 102ᵇ is connected with one arm of a bell crank lever 132. Said lever is fulcrumed at 133 to a fixed support and its other arm loosely enters a slot 134 in the locking member 116ª. When the pull rod is released the spring 131 retracts the locking member and acts through the lever 132 and the cable 44ᵇ to retract the pull rod to its unlocked position. When the pull rod is pulled outward and locked, the cable moves the bell crank lever to project the locking member against the force of the spring 131 into locking engagement with the lever 114. A locking member 109ª substituted for the locking member 109 of the starter switch plunger, may be fixed to the locking member 116ª and retracted by the spring 131 and projected by the lever 132, into locking engagement with the plunger.

Figure 15:
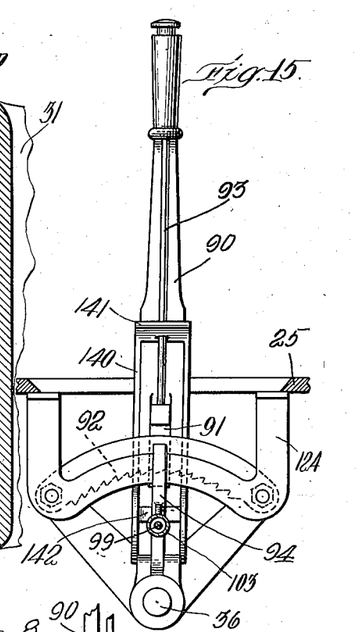
Figure 15 is a side elevation of the emergency brake lever looking from the right in Figure 14.

Means may be provided as shown by Figures 14, 15 and 16, for preventing the locking-arm 94 from accidentally assuming its locking position, shown by Figure 16, said means including a slidable sleeve 140 on the emergency brake lever 90, provided with a lug or pedal 141, adapted to be depressed by the operator's foot, and with a cross-bar 142, which normally crosses the path of the tooth 96 of the locking-arm 94, thereby confining the latter in its retracted position, as shown by Figure 14.

When it is desired to permit the locking-arm 94 to lock the pawl 91, the branch cable 99 is loosened and the operator's foot presses the sleeve 140 downward to the position shown by Figure 16, thereby displacing the bar 142 and permitting the tooth 96 to lock the pawl 91 in engagement with the ratchet. When the pressure on the sleeve is removed, the cross-bar 142 is forced upward by the bearing spring 97 against the tooth 96, and confines the locking-arm 94 in locking position (Figure 16).

Figure 23ª shows a hooked locking-arm 143, the only function of which is to lock the floor section 25. Said arm is pivoted at 144 in a fixed housing 145, below the floor section, and is normally pressed by a spring 146 into engagement with an apertured ear 147, fixed to the floor section. A branch 148 of the cable 100 is engaged with the locking-arm 143, another branch 120 of this cable being connected with the locking bolt 116 associated with the gear shift lever 114, as in Figure 10. When the cable 100 is tensioned to retract the normally projected locking bolt 116, the branch 148 retracts the locking-arm 143, as shown by dotted lines. When the cable is deprived of tension the spring 146 projects the locking-arm 143.

I claim:

1. In an automobile lock, a series of controls including clutch and brake pedals, and an auxiliary control, locking members adapted to be projected to lock said pedals, a spring normally retracting said locking members, a biased locking member normally projected into locking engagement with an element of said auxiliary control, a manually operable primary pull cable for projecting said pedal-locking members, and tensioning said spring, a secondary pull cable connecting the pedal-locking members with the biased locking member, the arrangement being such that when the primary cable is pulled, the secondary cable is deprived of tension and permits the biased locking member to act, and when the primary cable is released the spring retracts the pedal-locking members and tensions the secondary cable to cause the retraction thereby of the biased locking member, and means for locking said primary cable to hold the said locking members in locked position.

2. In an automobile lock, a series of controls including clutch and brake pedals and a plurality of auxiliary controls, locking members adapted to be projected to lock said pedals, a spring normally retracting said locking members, a plurality of biased locking members, each associated with a movable element of one of said auxiliary controls and normally projected into locking engagement with said element, a manually operable primary pull cable for projecting said pedal-locking members and tensioning said spring, a secondary pull cable having branches and connecting the pedal-locking members with the said biased locking members, the arrangement being such that when the primary cable is pulled, the secondary cable is deprived of tension and permits the biased locking members to act simultaneously, and when the primary cable is released, the spring retracts the pedal-locking members and tensions the secondary cable, to cause the simultaneous retraction thereby of the biased locking members, and means for locking said primary cable to hold said locking members in locked position.

3. In an automobile lock, a series of controls including clutch and brake pedals, and an auxiliary control including an emergency brake lever having a lever-confining pawl, locking members adapted to be projected to lock said pedals, a biased locking member normally projected into locking engagement with said pawl, a manually operable primary pull cable for projecting said pedal-locking members and tensioning said spring, a secondary pull cable connecting the pedal-locking members with the biased locking members, the arrangement being such that when the primary cable is pulled, the secondary cable is deprived of tension and permits the biased locking member to act, and when the primary cable is released, the spring retracts the pedal-locking members and tensions the secondary cable to cause the retraction thereby of the biased locking member, and means for locking said primary cable to hold the said locking members in locked position.

4. In an automobile lock, a series of controls including clutch and brake pedals, and an auxiliary control including the plunger of a starting switch, locking members adapted to be projected to lock said pedals, a biased locking member normally projected into the path of said plunger to prevent the depression thereof, a manually operable primary pull cable for projecting said pedal-locking members, and tensioning said spring, a secondary pull cable connecting the pedal-locking members with the biased locking members, the arrangement being such that when the primary cable is pulled, the secondary cable is deprived of tension and permits the biased locking member to act, and when the primary cable is released, the spring retracts the pedal-locking members and tensions the secondary cable to cause the retraction thereby of the biased locking member, and means for locking said primary cable to hold the said locking members in locked position.

5. In an automobile lock, a series of controls including clutch and brake pedals and an auxiliary control including the gear shift lever of a transmission mechanism, locking members adapted to be projected to lock said pedals, a biased locking member, normally projected into the path of said lever, and adapted to confine the latter in either of a plurality of positions, a manually operable primary pull cable for projecting said pedal-locking members, and tensioning said spring, a secondary pull cable connecting the pedal-locking members with the biased locking member, the arrangement being such that when the primary cable is pulled, the secondary cable is deprived of tension and permits the biased locking member to act, and when the primary cable is released the spring retracts the pedal-locking members and tensions the secondary cable to cause the retraction thereby of the biased locking member, and means for locking said primary cable to hold the said locking members in locked position.

6. In an automobile lock, a removable floor portion provided with a locking member, a series of controls including clutch and brake pedals, and an auxiliary control, locking members adapted to be projected to lock said pedals, a spring normally retracting said locking members, a biased locking member, normally projected into locking engagement with an element of said auxiliary control and formed to engage the locking member of said removable floor portion to lock the latter, a manually operable primary pull cable for projecting said pedal-locking members, and tensioning said spring, a secondary pull cable connecting the pedal-locking members with the biased locking member, the arrangement being such that when the primary cable is pulled, the secondary cable is deprived of tension and permits the biased locking member to act, and when the primary cable is released the spring retracts the pedal-locking members and tensions the secondary cable to cause the retraction thereby of the biased locking member, and means for locking said primary cable to hold the said locking members in locked position.

7. In an automobile lock having the organization specified by claim 1, an auxiliary control, a biased locking member normally projected into locking engagement with an element of said auxiliary control, a secondary pull cable connecting the said pedal locking member with the biased locking member, and adapted to be alternately tensioned by said spring and deprived of tension, the arrangement being such that the said pedal locking members and the biased locking member are simultaneously projected when the said primary cable is pulled, and are simultaneously retracted when the primary cable is released, and means for locking the primary cable to hold said locking members in locked position.

8. In an automobile lock, a control including an element movable by the driver; a biased locking member normally projected into locking engagement with said element to lock said control; operating means including a manually operable pull member, a flexible cable, connections between the pull member and the cable and between the cable and the biased locking member, and a spring adapted to be tensioned by a pull on the pull member, the arrangement being such that when the pull member is pulled outward the spring is tensioned and the cable is deprived of tension and permits the biased locking member to act, and when the pull member is released, the spring tensions the cable and causes the retraction thereby of the biased locking member, and means for locking said pull member to tension the spring and deprive the cable of tension, so that the biased locking member is free to act.

9. In an automobile lock, a plurality of controls, each including an element movable by the driver; a plurality of biased locking members, one for each of said elements, normally projected into locking engagement with the said elements; operating means including a manually operable pull member, a flexible cable, connections between the pull member and the cable and between the cable and the biased locking members; and a spring adapted to be tensioned by a pull on the pull member, the arrangement being such that when the primary member is pulled outward the spring is tensioned and the cable is deprived of tension and permits the biased locking members to simultaneously act, and when the pull member is released the spring tensions the cable and causes the simultaneous retraction thereby of the biased locking members; and means for locking the pull member to tension the spring and deprive the secondary pull member of tension, so that the biased locking members are free to act simultaneously.

10. The combination with an automobile transmission mechanism which includes a gear shift lever and is capable of being disposed in positions for neutral, forward or reverse gear connections, of means engageable directly with said lever to lock said mechanism selectively in any of its positions.

11. The combination with an automobile transmission mechanism which includes a gear shift lever and is capable of being disposed in positions for neutral, forward or reverse gear connections, of a locking member engageable directly with said lever to lock said mechanism selectively in any of its positions, means for operating said locking means, and means for locking the operating means so as to maintain said locking members in locking engagement with said lever.

12. The combination with an automobile transmission mechanism comprising a gear shift lever and a plurality of gear shift rods, of a locking member movable to directly engage a portion of said lever to lock said mechanism selectively in any position thereof, means for operating said locking member, and means for locking the operating means in a predetermined position such as to maintain the locking member in direct engagement with the gear shift lever.

13. In an automobile locking device, the combination with a transmission mechanism capable of being disposed in positions for neutral, forward or reverse gear connection, and a clutch, of means for locking the clutch in engaged position, and means operatively connected with said clutch locking means for locking the transmission mechanism selectively in any of its positions.

14. In an automobile locking device, the combination with a transmission mechanism including a plurality of gear shift rods and a gear shift lever engageable therewith to dispose said mechanism in positions of neutral, forward or reverse gear connection, and a clutch, of means for locking said clutch in engaged position, and means operatively connected with said clutch locking means for engaging said gear shift lever to lock said transmission mechanism selectively in any of its positions.

15. In an automobile locking device, the combination with a clutch and a transmission mechanism capable of being disposed in positions for neutral, forward or reverse gear connection, of means for locking said clutch in engaged position, and mechanism controlled by the motion of said clutch locking means to lock the transmission mechanism selectively in any of its positions.

16. In an automobile locking device, the combination with a clutch, a transmission mechanism capable of being disposed in positions for neutral, forward or reverse gear connection, and a motor starting device, of means for locking said clutch in engaged position, and means controlled by motion of the clutch operating means for locking said motor starting device, and for locking said transmission mechanism in any of its positions.

In testimony whereof I have affixed my signature.

EDGAR J. MARTEL.